UNITED STATES PATENT OFFICE.

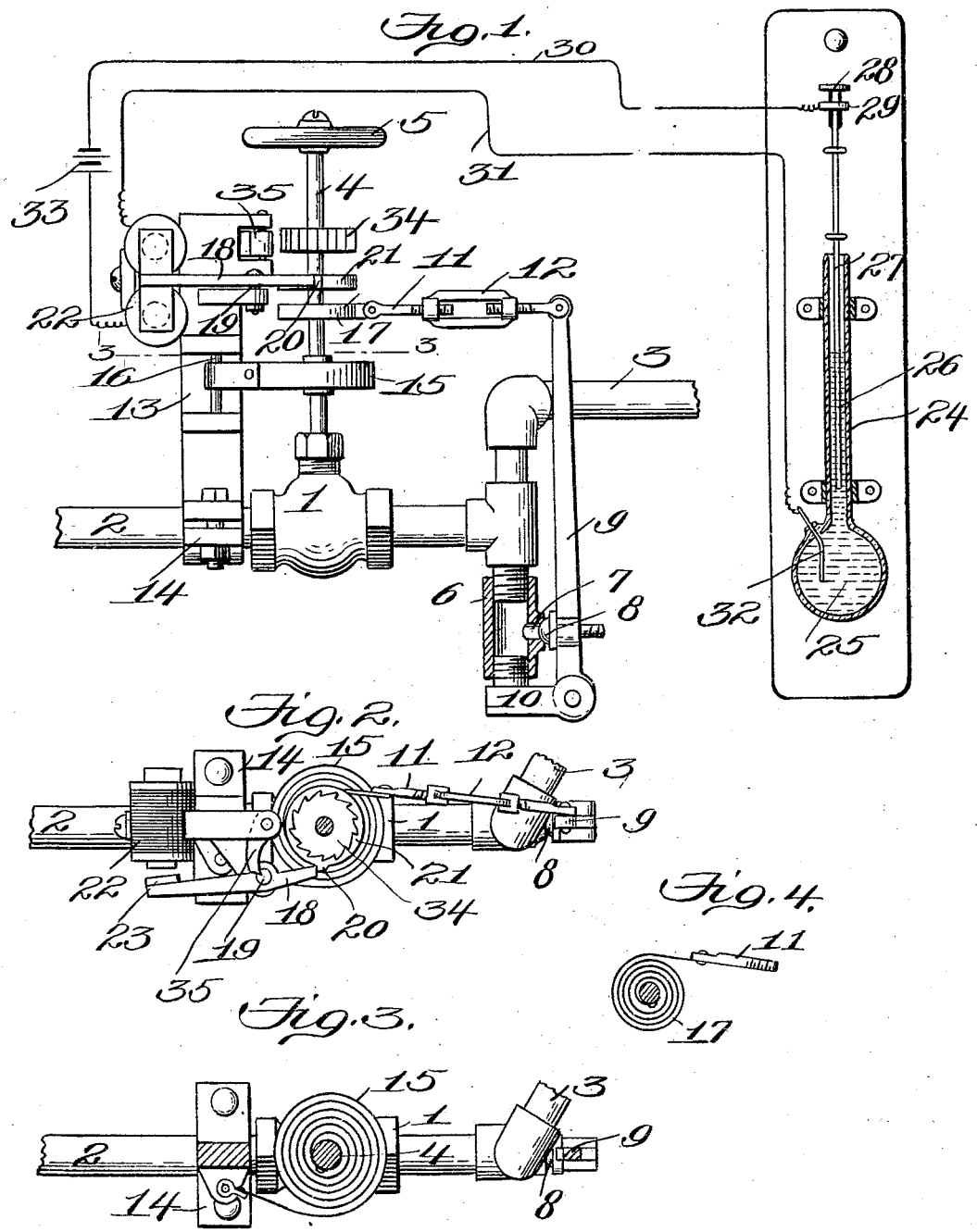

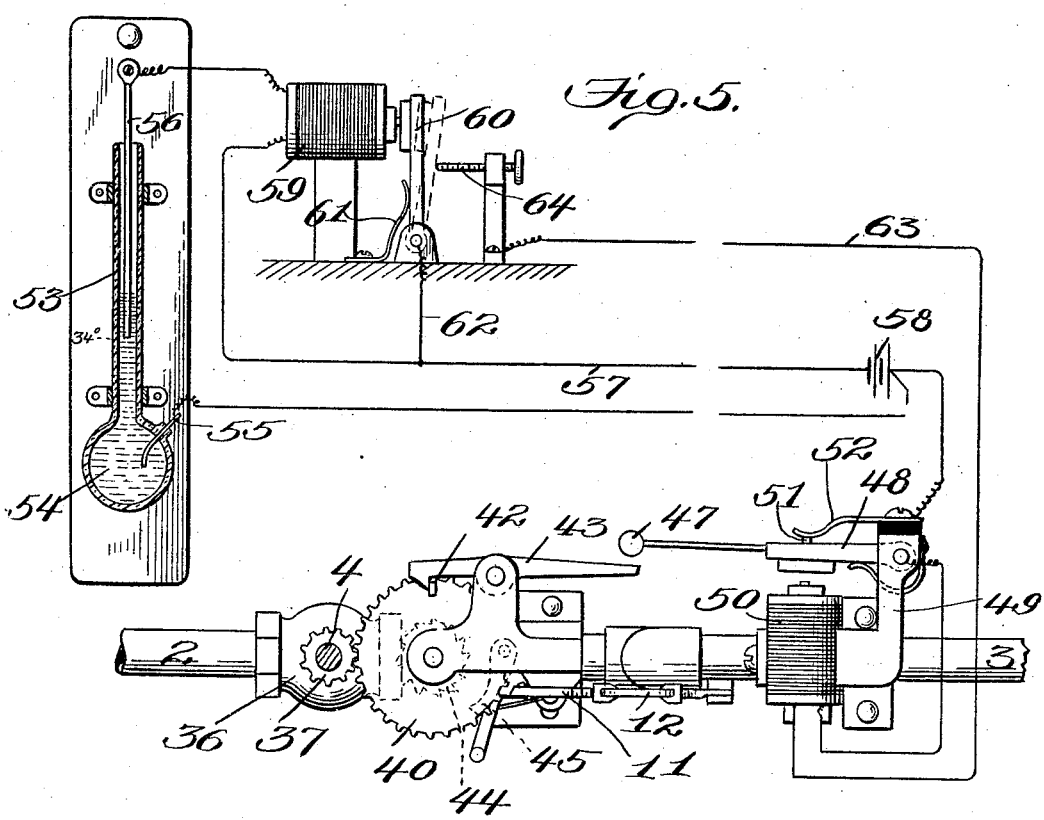
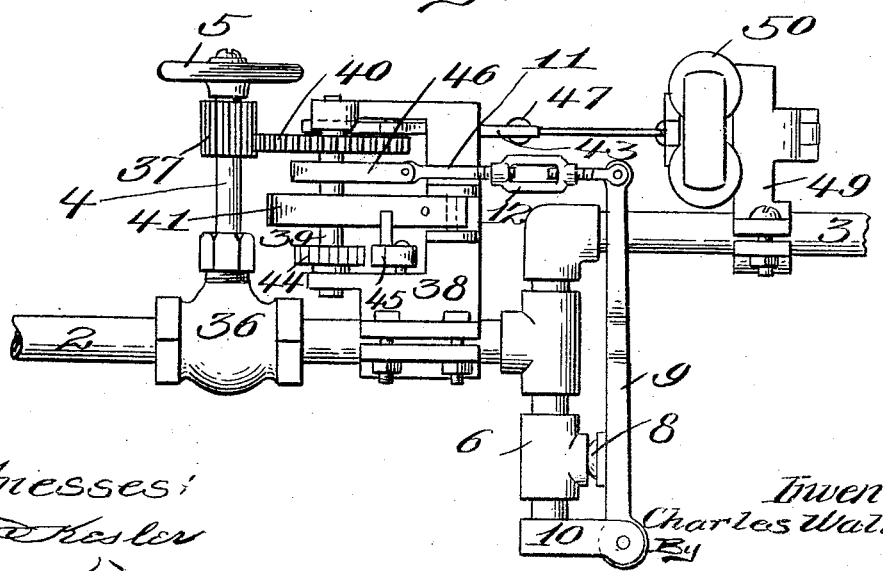

CHARLES WALKER, OF CHARLESTON, SOUTH CAROLINA.

AUTOMATIC VALVE-OPERATING MECHANISM.

944,927.          Specification of Letters Patent.    Patented Dec. 28, 1909.

Application filed July 24, 1908. Serial No. 445,245.

*To all whom it may concern:*

Be it known that I, CHARLES WALKER, a citizen of the United States, residing at Charleston, in the county of Charleston and State of South Carolina, have invented new and useful Improvements in Automatic Valve-Operating Mechanism, of which the following is a specification.

My present invention relates to improvements in automatic valve operating mechanism of a character wherein the flow of water and other fluids is controlled by temperature conditions, and it has for its object primarily to provide a simple and improved mechanism of this character which is adapted to be used in connection with sprinkler or fire extinguishing systems for automatically opening the sprinkler valves upon the rising of the temperature above a given point or for preventing the freezing of water in pipes entering buildings and other places where the pipes are exposed to a freezing temperature, by automatically closing a cut-off valve connected in the service or supply pipe and at the same time opening a vent which will permit the water contained in the piping to drain out, freezing of the contents and consequent bursting of the pipe with the resulting inconvenience and expense being thereby avoided.

More specifically, the invention consists of a cut-off or controlling valve and a venting valve both of which are connected in the pipe system, means being provided which normally tends to close the cut-off valve and open the vent valve which means, however, is detained in its operation by an electrically-released part, the operation of the electrically-released part depending upon the temperature, a thermally-controlled operated circuit controller being provided whereby the mechanism may be released to close the cut-off valve and simultaneously open the vent to drain the piping when the temperature falls below the freezing point or any other predetermined temperature.

To these and other ends, the invention consists in certain improvements, and combinations and arrangements of parts, all as will be hereinafter more fully described, the novel features being pointed out particularly in the claims at the end of the specification.

In the accompanying drawing: Figure 1 illustrates a thermally-controlled valve operating mechanism constructed in accordance with my present invention; Fig. 2 is a plan view of the valve and its coöperating mechanism, the valve handle being omitted; Fig. 3 represents a transverse section on the line 3—3 of Fig. 1 showing the spring for operating the cut-off valve when the mechanism is released; Fig. 4 is a detail view of the spring for controlling the vent valve; Fig. 5 illustrates a modified form of the invention; and Fig. 6 is a side elevation of the modified form of valve controlling mechanism as shown in Fig. 5.

Similar parts are designated by the same reference characters in the several views.

Valve controlling mechanism constructed in accordance with my present invention is capable of being applied generally to water or fluid systems of various kinds wherein it is desirable to control the supply or flow of fluid according to temperature conditions, although the object I have particularly in view is to provide mechanism which will automatically open the sprinkler valves of a fire extinguishing system or will prevent the freezing of water in pipes of buildings and in other places when the temperature falls to near the freezing point.

In the accompanying drawing, I have shown two forms of the invention, but it will be understood, of course, that the invention is not necessarily limited to the precise details of construction and the arrangement of the parts as shown, as certain modifications and changes in these respects may be made in order that the invention may be applied to the best advantage in each particular case.

In that form of the invention shown in Fig. 1, a cut-off or controlling valve 1 is connected between the service or supply pipe 2 and the pipe 3 which leads into the building or to any other point where the water or fluid is to be used. This valve may be of any suitable construction, that shown in the present instance having a rotatable valve stem or spindle 4 which, when rotated in one direction, will close the valve for the supply water to the building from the service pipe and when rotated in a reverse direction will establish communication between these pipes.

A handle 5 of suitable construction may be employed for opening the valve. A branch pipe 6 is connected to the piping leading to the building and this branch pipe is provided with a vent 7 through which the water contained in the piping in the building may be drained off after the cut-off or controlling valve has been closed, this vent being controlled by a vent valve 8 which may be of any suitable construction, that shown in the present instance being mounted on a lever 9 which is pivoted to a suitable bracket or support 10 fixed to the piping and is provided at its free end with an operating rod 11, the latter being preferably adjustable with respect to its length by means of a turn buckle or equivalent device 12. The controlling and operating mechanism for these valves is preferably carried by a suitable support which may be mounted in any suitable manner, the support 13 shown in the present instance being attached to the piping by means of a clamp 14 and extending upwardly beside the stem of the cut-off valve. A spring is provided for immediately closing the cut-off valve the moment the stem thereof is released, this spring being wound so as to store up energy when the cut-off valve is opened, a spiral spring 15 being employed in the present instance which surrounds the stem of the cut-off valve and has its inner end fixed thereto, the outer end of this spring being attached at 16 to the support 13. The vent valve is preferably provided with means for allowing it to open when the cut-off valve closes, this vent valve being operated directly from the stem of the cut-off valve in the present instance by means of a spiral or convoluted spring 17 which encircles the stem 4 and has its inner end fixed to this stem, the outer end of the spring being attached to the operating rod 11 for the vent valve. This spring 17 is convoluted in the same direction as the operating spring 15 so that both of these springs will be wound when the cut-off valve is opened, the spring 17 being thereby reduced in diameter so as to operate the rod 11 and thereby close the vent valve, and as the cut-off valve closes, this spring 17 will expand in diameter, thereby permitting the vent valve to open. By providing a turn buckle in the operating rod of the vent valve, the latter may be properly seated when the cut-off valve is open.

The cut-off valve is normally retained in open position against the action of the spring 15 by means of a detent 18 which is pivoted at 19 to the stationary bracket 13 and engages at one end with a projection 20 formed on a disk 21 which is fixed to turn with the valve stem. This detent is preferably released electrically, and the condition of the electric circuit is controlled according to the temperature. To accomplish this result, an electro-magnet 22 is mounted upon the support 13 in a position to coöperate with an armature 23 attached to the detent 18, the arrangement being such that when this magnet is energized, it will attract the armature 23 and thereby disengage the detent from the retaining projection 20, thereby permitting the spring 15 to immediately close the cut-off valve. Normally, however, this magnet is deënergized and the detent will prevent closing of the cut-off valve. Any suitable thermally influenced device may be provided for controlling the electric circuit for the magnet whereby the detent will be retained until the temperature falls below the freezing point or any other predetermined temperature. In that form of the invention shown in Fig. 1, a thermometer tube 24 is shown which may be mounted upon a suitable support at a convenient position so as to be influenced by the temperature of the atmosphere and this tube contains a body of mercury 25 which fills the bulb of the tube and extends a suitable distance upwardly into the narrow portion thereof, a float 26 being mounted upon the surface of the mercury and carries a circuit controlling rod 27, the lower end of which is immersed in the mercury so as to form an electrical contact therewith, and the upper end of this rod is provided with a contact piece 28 which, while the mercury is expanded in the tube owing to the temperature standing above the freezing point, is elevated or disengaged with reference to a stationary contact piece 29, the falling of the contact piece 28 due to the fall in temperature and the consequent contraction of the mercury closing an electrical circuit through these contacts. In the present instance, the wires 30 and 31 serve to connect the electro-magnet with the thermally influenced device, the wire 30 being attached to the stationary contact piece 29 while the wire 31 is connected to an electrode 32 which enters the bulb of the mercury tube and forms an electrical contact with the mercury contained therein. A battery or other suitable source of current supply 33 is also connected in the circuit.

Under normal temperature conditions, the cut-off valve will be open, the detent retaining it in such position, and as the spring 17 at this time is contracted, the vent valve will be closed. Under ordinary temperature conditions, the mercury in the thermally influenced device will be expanded to such an extent that the contact piece 28 on the circuit controlling rod supported by the column of mercury will be disengaged from the stationary contact 29 so that the electrical circuit for the releasing magnet will be open or inactive. However, when the temperature falls to near the freezing point or any other predetermined temperature, the mercury in the tube will contract sufficiently to permit the movable contact piece 28 to engage and form an electrical contact with the contact piece 29, the electrical circuit being thereby closed through the electro-magnet so that the latter is energized, the armature 23 on the detent being thereby attracted causing a pivotal movement of the detent which will disengage the same from the retaining projection 20 on the valve stem, the tensioned spring 15 acting to immediately close the cut-off valve so as to interrupt the flow of water from the service pipe into the piping of the building. As the stem of the cut-off valve revolves in closing the cut-off valve, the spring 17 will expand or unwind, thereby allowing the vent valve to open. The water contained in the piping of the building is thereby permitted to drain out. When it is desirable to reëstablish connection between the service pipe and the piping of the building, it is only necessary to turn the valve stem of the cut-off valve so as to open the latter, the vent valve being automatically closed as the cut-off valve is opened. In order to prevent retrograde movement of the valve stem of the cut-off valve during the opening thereof, a ratchet wheel 34 is preferably fixed thereto and arranged to coöperate with a pawl 35 pivoted upon the stationary bracket or support 13, this pawl being swung clear of the ratchet wheel after the projection 20 has been properly engaged with the detent.

In that form of the invention shown in Figs. 5 and 6, the releasing and valve closing mechanism is capable of being readily applied to valves of ordinary construction as well as those already in use without the necessity of replacing the valve in use with a new one, the cut-off valve 36 being of ordinary construction and having a pinion 37 fixed upon the stem thereof, the pipe 3 leading to the building and the branch pipe 6 having the vent valve 8 therein being arranged in the same manner shown in the preceding construction. The valve releasing and closing mechanism in this form of the invention is mounted upon a suitable bracket or support 38 which may be clamped to one of the pipes or otherwise suitably mounted, it having a shaft or spindle 39 journaled therein preferably parallel to and at one side of the spindle of the cut-off valve, this shaft being connected to the spindle of the cut-off valve by means of a gear 40 which coöperates with the pinion 37. A spiral spring 41 surrounds the shaft 39 as in the previous construction and normally tends to close the cut-off valve, and a retaining projection 42 is fixed to the gear 40 and coöperates with a detent 43 which normally serves to prevent closing of the cut-off valve. A ratchet 44 is also mounted on the shaft 39 and coöperates with a pawl 45 whereby the operation of opening the valve may be facilitated. A second spiral spring 46 is attached to the shaft 39 as in the previous construction and serves to open and close the vent valve as the cut-off valve is closed and opened, respectively. In placing the valve releasing and closing mechanism in cellars and other damp places, there may be a tendency in some cases for the detent to corrode and thereby stick to the retaining projection. In order to insure the proper releasing of the detent to permit closing of the cut-off valve in such cases, I provide a vibratory tapper or hammer 47 which is mounted upon an armature 48 which is pivoted to a bracket 49 so as to coöperate with an electro-magnet 50, this armature carrying a contact point 51 which coöperates with a circuit-interrupting spring 52, the contact 51 leaving the circuit-interrupting spring momentarily when the armature carrying it is attracted by the magnet, and upon the rebound of the armature, the circuit is reëstablished through these parts so that a rapid vibratory movement is imparted to the hammer or tapper, thereby delivering a series of blows upon the end of the detent which will serve to insure the proper releasing thereof from the projection 42, although these parts may have become corroded. In this form of the invention, I have also shown a somewhat modified form of thermostat and electrical devices controlled thereby for releasing the valve operating mechanism. In this instance a mercury tube 53 is shown which either may be of metal so as to form an electrical contact with the body of mercury 54 contained therein, or a separate electrode 55 may extend through the tube into the bulb thereof in case the tube is made of glass as usual. Depending into the top of the tube is a second electrode or circuit controlling rod 56 which is preferably stationary with respect to the mercury tube in order that the mercury may rise above the bottom of this rod or electrode and thereby close the electrical controlling circuit while the temperature is above a certain point, and when the temperature falls below said point, the contraction of the mercury will cause it to fall below the lower end of this rod 56 and will thereby break the electric circuit. In this form of the invention, a normally closed circuit 57 is formed through the thermostat, the battery or source of current supply 58 and an electro-magnet 59, the terminals of the circuit being connected respectively to the electrodes 55, 56. The magnet 59 is provided with an armature 60 which has a normal tendency to fall away from the magnet when the latter is deënergized by the breaking of the circuit through the thermostat, a spring 61 being shown in the present instances for immediately retracting the armature. This armature is connected by a wire 62 to the electrical circuit and when retracted rests against and completes a second circuit 63 through a contact screw or device 64, the latter being connected in the circuit 63. The magnet 50, the armature 48 and the contacts 51 and 52 are also connected in the circuit 63 together with the battery or source of current supply 58. According to this form of the invention, the cut-off or controlling valve 36 may be set by its handle either in open position in case the invention is applied to an automatic cut-off for service pipes, or, it may be set in closed position in case the invention is applied to a fire extinguishing or sprinkler system, the spring 41 being adapted to be arranged so as to have a tendency to either close or open this valve according to the intended use of the apparatus. As the valve is opened or closed, the spring 41 will be tensioned and, in the present instance, the spiral spring 46 will also be tensioned or collopsed so as to close the vent valve 8, the projection 42 coöperating with the detent when the valve has been properly set whereby the detent will retain the valve in such position until a certain temperature change has occurred at which time it is desirable to cause the opening or closing of the valve. In this form of the invention, the thermostat is adapted for use in connection with service pipes for automatically cutting off the water supply when the temperature falls to near the freezing or other predetermined point. Normally, the mercury in the tube will be sufficiently expanded to cover the lower portion of the electrode 56, the circuit 57 being thereby closed through the thermostat and the magnet 59 causing the latter to be energized and to attract its armature 60, the attraction of the armature 60 causing the latter to leave or disengage from the contact screw 64 and thereby maintain the circuit 63 open, the magnet 50 being inactive. As soon as the mercury, however, contracts by reason of the falling of the temperature, the level of the mercury will fall below the lower end of the electrode 56 and will thereby break the circuit from the magnet 59, allowing the armature 60 to be retracted and thereby engage the contact screw 64. At this moment, the circuit 63 is closed causing the magnet 50 to be energized. As this magnet attracts its armature 48, the hammer or ball 47 will strike the detent 43. However, as the armature 48 is attracted, the contact 51 thereon will momentarily leave the contact spring 52 causing the circuit 63 to be momentarily interrupted allowing the said armature to be retracted, but on the closing of the circuit through the contacts 51 and 52, the magnet 50 will be again energized and this operation will continue and cause a series of hammer blows to be struck upon the detent which will insure its proper release from the projection 42 and, as this detent releases, the projection 42 on the shaft 39 will operate under the action of the spring 41 to either open or close the valve as the case may be.

It will be understood that the valve operating mechanism shown in Figs. 5 and 6 may be used either in connection with the thermostat and electrical devices therein shown, or it might be used in connection with the thermostat and electric circuit shown in Fig. 1 and vice versa. It will also be understood that thermostats of different constructions may be employed whereby the opening or closing of the circuit upon the temperature rising or falling beyond a predetermined point may be accomplished as desired in each case.

Automatic valve operating mechanism constructed in accordance with my present invention is capable of use generally and in various connections wherein it is desirable to automatically close or open a valve to control the flow of water or other fluids upon the temperature rising or falling beyond a predetermined point, the mechanism being especially adapted for use in automatically cutting off the flow of water in service pipes and for emptying the same to prevent freezing when the temperature falls to near the freezing point, and for automatically opening valves in sprinkler or fire extinguishing systems upon the temperature rising beyond a given point, and in either case, the thermostat or thermally-controlled device acts to control the electrical circuit which in turn acts upon the releasing devices, whereby the valve operating mechanism is instantly released, causing the valve to be immediately seated or unseated as the case may be.

By using a spring for effecting the operation of the valve, certainty in the opening or closing thereof is insured, and by employing electrical means for releasing the valve operating mechanism, the thermally active device may be placed at any desired point and conveniently connected by suitable wiring to the valve. Moreover, in employing the mechanism for cutting off and emptying pipes to prevent freezing and for other purposes, the spring or spiral member which is allowed to expand upon the closing of the valve provides simple and effective means for operating the vent valve.

Having thus described the invention, what I claim is:

1. Automatic valve operating mechanism of the class described comprising a fluid-controlling valve, an actuating spring constantly acting on said valve to close it, a detent for normally preventing operation of said valve under the influence of its operating spring, a vent valve, means connecting the controlling and vent valves whereby a closing of one valve under the action of said spring will automatically effect an opening of the other, and means for releasing said detent to permit operation of the valves.

2. Automatic valve operating mechanism comprising a fluid-controlling valve having a rotatable spindle for opening and closing it, a spring acting on said spindle and tending to close said valve, a detent to prevent rotation of the valve spindle under the influence of its actuating spring, a vent valve adapted to be opened by the action of said spring, electromagnetically-controlled means for releasing the detent, and a thermally-influenced circuit controller for controlling the operation of the releasing means according to temperature conditions.

3. Automatic electrically controlled valve operating mechanism comprising a fluid controlling valve having a rotatable spindle for opening and closing the same, a spring operatively connected to the valve spindle and serving to actuate the same, a vent valve also operable by the action of said spring a detent for normally preventing operation of the valve spindle under the influence of said spring, an electro-magnet adapted to release the detent, and a thermally influenced circuit controller connected electrically to said magnet for controlling the operation of the detent.

4. Automatic electrically controlled valve operating mechanism comprising a fluid controlling valve having a rotatable spindle, a support arranged at one side of the valve spindle, a spring connected to rotate the valve spindle and attached to said support, a detent pivoted on said support and arranged to retain the valve in a predetermined position, a second valve having means for opening it while said fluid controlling valve is being closed an electro-magnet mounted in coöperative relation with the detent so as to release the same when energized and a thermally influenced circuit controller connected in circuit with said magnet and serving to energize the same when a predetermined temperature exists.

5. Automatic valve operating mechanism comprising a fluid controlling valve provided with a rotatable spindle, an actuating spring connected to act on the spindle, a vent valve operatively connected to the spindle of the fluid controlling valve a detent for normally preventing operation of the valve spindle under the influence of said actuating spring, means for automatically releasing said detent, and a ratchet mechanism for preventing retrograde movement of the valve spindle during the setting thereof.

6. The combination of a service pipe for houses and the like, a controlling valve for cutting off the supply of water and having a rotatable spindle for opening and closing it, a spring acting on said spindle and tending to close said valve, a detent to prevent rotation of the valve spindle under the influence of its actuating spring, a vent valve connected to said pipe for venting the water therein after the controlling valve has been closed, a convoluted device operatively connected to the spindle of the controlling valve and also to the vent valve, said convoluted member expanding to open the vent valve when the cut-off valve is closed, and a magnetically operated vibratory hammer arranged to produce a series of blows upon the detent to release the same.

7. Automatic valve operating mechanism of the class described comprising a fluid controlling valve having a rotatable spindle, a shaft operatively connected to said spindle, a spring mounted on said shaft and normally acting to operate the valve spindle, a second valve operatively connected to said spindle and operable to open while the said fluid controlling valve is being closed, a locking projection rotatable with said shaft, a detent adapted to coöperate with said projection to prevent operation of the valve spindle, and magnetically operated means controlled by temperature conditions for releasing said detent.

8. Automatic valve operating mechanism of the class described comprising a fluid controlling valve having a rotatable operating part, means normally tending to operate the same, a detent for preventing operation of said valve, a second valve, a spiral element connected to said rotatable operating part of said fluid controlling valve and adapted to be expanded and contracted according to the opening or closing movements of the controlling valve said spiral being connected to control the position of the second valve, and means for automatically releasing said detent.

9. Automatic valve operating mechanism comprising a fluid cut-off valve having a rotatable operating part, a vent valve, means normally tending to close the cut-off valve, a spiral spring connected to said operating part of the cut-off valve and adapted to expand during the closing movement of the cut-off valve, said spiral spring being connected to open the vent valve, and means for automatically releasing the cut-off valve to permit the closing thereof.

10. Automatic valve operating mechanism comprising a fluid controlling valve, a vent valve, a shaft arranged at one side of the said valve and operatively connected to the rotatable spindle thereof, a spring encircling said shaft and normally tending to operate the spindle of the controlling valve, a second spiral spring encircling said shaft and adapted to expand and contract according to the direction of rotation of said shaft to control the vent valve, a detent for normally holding the shaft from rotation, electromagnetic means for releasing the detent, and a thermally influenced circuit controller for controlling the operation of the valves according to temperature conditions.

11. Automatic valve operating mechanism comprising a fluid cut-off valve and a vent valve, a revoluble operating member forming a stem for the cut-off valve, means connecting said operating member with the vent valve to cause an opening movement of one valve during the closing movement of the other valve, a detent for normally holding said valves in a predetermined condition, and thermally-influenced means for automatically releasing the detent when a predetermined temperature condition exists.

In testimony whereof I have hereunto set my hand in presence of two subscribing witnesses.

CHARLES WALKER.

Witnesses:
  CHAS. S. HYER,
  CLARENCE A. BATEMAN.